United States Patent [19]
Dunn

[11] 3,992,612
[45] Nov. 16, 1976

[54] RATE MULTIPLIER

[75] Inventor: Gerald A. Dunn, Adelphi, Md.

[73] Assignee: The United States of America as represented by the Secretary of the Army, Washington, D.C.

[22] Filed: Oct. 14, 1975

[21] Appl. No.: 622,341

[52] U.S. Cl. .......................... 235/150.3; 307/223 R; 328/43
[51] Int. Cl.² ................... G06F 15/20; H03K 21/00
[58] Field of Search ............ 235/150.3; 328/15, 39, 328/41, 43, 45, 48; 307/220 R, 221 R, 223 R

[56] References Cited
UNITED STATES PATENTS

| | | | |
|---|---|---|---|
| 2,913,179 | 11/1959 | Gordon | 235/150.3 |
| 3,230,353 | 1/1966 | Greene et al. | 235/150.3 X |
| 3,518,552 | 6/1970 | Carlow | 328/43 |
| 3,806,718 | 4/1974 | Stewart | 235/150.3 X |
| 3,818,354 | 6/1974 | Tomisawa et al. | 328/41 |
| 3,820,028 | 6/1974 | Thomas | 328/14 |
| 3,832,639 | 8/1974 | Janssen | 328/14 |

*Primary Examiner*—Jerry Smith
*Attorney, Agent, or Firm*—John R. Utermohle; Thomas O. Maser; Barry N. Young

[57] ABSTRACT

A rate multiplier with which a given input binary pulse train generates an output pulse train having a rate which is defined by the expression $$R_o = (R_{in} \cdot x)/(2 \cdot n)$$

where $R_o$ is the output pulse rate, $R_{in}$ is the input pulse rate, $n$ is the number of stages in a Johnson counter and $x$ is any integer from 0 to 2n-1. The rate multiplier may be built in any of the common solid state technologies and, for any given technology, will operate reliably at a substantially faster rate than is usually possible. A plurality of rate multipliers may be cascaded to provide further control of the output pulse rate. Because of the cascading technique disclosed, only the first rate multiplier need be operable at the maximum required clock rate, with each succeeding cascaded rate multiplier being required to operate at a rate which is only $1/(2 \cdot n)$ as fast as the previous rate multiplier. External controls include a series of inputs by which the number $x$ may be provided to the circuit by easily alterable controls.

4 Claims, 6 Drawing Figures

| EOR | 0 | 1 |
|---|---|---|
| 0 | 0 | 1 |
| 1 | 1 | 0 |

| AND | 0 | 1 |
|---|---|---|
| 0 | 0 | 0 |
| 1 | 0 | 1 |

| OR | 0 | 1 |
|---|---|---|
| 0 | 0 | 1 |
| 1 | 1 | 1 |

RATE MULTIPLIER

BACKGROUND OF THE INVENTION

1. Field of the Invention.

This invention relates generally to the field of frequency synthesizers, and more specifically to those synthesizers wherein the output is a binary pulse train having a frequency which is a controllable fraction of the frequency of an input pulse train.

2. Background of the Invention.

Rate multipliers, which provide an output pulse train having a frequency which is some fraction of the frequency of an input pulse train, are well known in the prior art. Generally, such rate multipliers provide an output which is $2^n$ weighted, that is, binary, quaternary, octal, hexadecimal, etc., although some decimal-weighted rate multipliers are also known.

Rate multipliers found in the prior art usually include shift registers whose stages may be required to change state at the clocking rate. Attempts at increasing this clock rate results in the circuit's becoming unreliable above certain clock rates, which rates are determined by the particular semiconductor technology involved. Finally, those rate multipliers found in the prior art which may be cascaded in order to divide the input pulse rate into a greater number of segments uniformally require all succeeding segments to be operated at the same clock rate as the original segment. Because the cost of such elements is normally related to the speed at which they will operate, increasing the multiplication factor by adding additional segments significantly increases the cost of the total device. It is desirable to have a rate multiplier capable of operating at high speeds with large multiplication factors, but which may be produced at a lower cost than those currently known in the prior art.

BRIEF SUMMARY OF THE INVENTION

It is an object of this invention to provide an $m$-weighted rate multiplier where $m$ can be any even integer.

It is a further object to provide a rate multiplier capable of operating reliably at higher speeds than is normally possible for devices utilizing toggling type shift registers.

It is a still further object to provide a rate multiplier which has higher than usual reliability at high clock rates.

It is a further object to provide a rate multiplier in which cheaper levels of technology may be utilized when they are cascaded with the high speed circuit.

It is also an object to provide an improved rate multiplier at a substantially reduced cost.

These and other advantages are obtained in the rate multiplier described herein below which includes: an oscillator or similar source of input pulses, a Johnson, or twisted tail ring counter, a logic circuit capable of detecting predetermined combinations of values within the Johnson counter, and a control circuit which activates selected segments of the logic circuit to pass a portion of the input signal to an output upon the detection of the predetermined combination of values within the counter.

BRIEF DESCRIPTION OF THE DRAWINGS

The description of the invention which follows may be more fully understood when read in conjunction with the associated drawings, in which.

DESCRIPTION OF THE PREFERRED EMBODIMENT

The usual purpose of a rate multiplier is to provide an output train having a rate which is some controllable fraction of the rate of an input pulse train. That is, Rate out = (rate in) · $(x/y)$.

where $x = 0, 1, 2, \ldots, y-1$ and $y$ is the "weighting" of the rate multiplier; for example, 10 for decimal, 8 for octal, 16 for hexadecimal, etc. For purposes of description, a decimal weighted rate multiplier will be described in detail, but it is to be understood that it is not intended that the invention be limited thereto.

Figures 1, 2A, 2B, 2C:
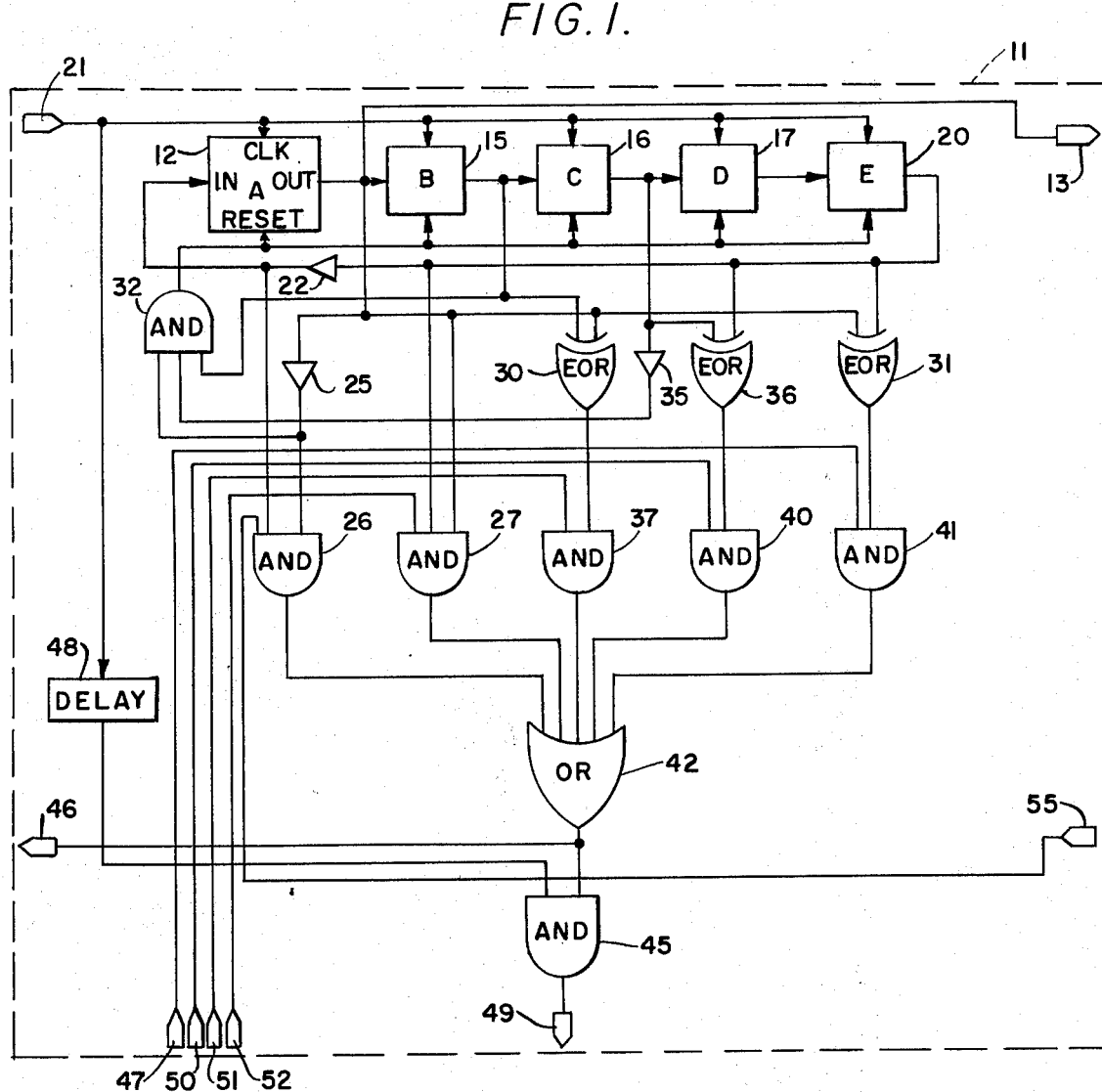
FIG. 1 is a logic diagram of a preferred embodiment of the invention.
FIG. 2a is a truth table for a two-input logic "exclusive OR" function.
FIG. 2b is a truth table for a two-input logic "AND" function.
FIG. 2c is a truth table for a two-input logic "OR" function.

Referring to FIG. 1, a decimal weighted rate multiplier 11 includes five shift register stages, 12, 15, 16, 17 and 20 which, upon the application of a pulse to an input terminal 21, shifts the binary value held in stage 17 into stage 20, the value held in stage 16 into stage 17, the value held in stage 15 into stage 16, and the value held in stage 12 into stage 15. Simultaneously, the value previously held in stage 20 is inverted by an inverter 22 before being shifted into the stage 12. The output of the first stage is provided to an output terminal 13.

In the general case for a $y$-weighted rate multiplier, there will be $y/2$ shift register stages. A circuit so configured, with each delay stage being fed by the preceeding delay stage, and the first delay stage being fed by the complement of the last delay stage, is commonly known as a Johnson counter, or as a twisted tail ring counter. Connected to the outputs of the delay stages are a plurality of logic gates which serve the purpose of decoding the contents of the delay stages. The particular decoding is different for each rate multiplier weighting, and may be developed by straight-forward analysis of the desired result as explained more fully below.

The particular decoding is not unique, and any configuration of logic elements which accomplishes the desired decoding is intended to be within the scope of the invention. For the decade counter of this embodiment, the output of the shift register stage 12 is connected through an inverter 25 to a first input of an AND gate 26, and directly to a first input of an AND gate 27, an exclusive-OR gate 30 and an exclusive-OR gate 31. The output of the shift register stage 15 is connected to an AND gate 32 and the exclusive-OR gate 30. The output of the shift register stage 16 is connected through an inverter 35 to AND gate 32 and directly to an exclusive-OR gate 36.

The output of the shift register stage 20 is connected directly to exclusive-OR gate 31, exclusive-OR gate 36 and AND gate 27, and through inverter 22 to AND gate 26. The output of inverter 25 is additionally connected to a third input of AND gate 32. Exclusive-OR gate 30 is connected to one input of an AND gate 37, exclusive-OR gate 36 is connected to one input of an AND gate 40, and exclusive-OR gate 31 is connected to one input of an AND gate 41. Each of the AND gates 26, 27, 37, 40 and 41 are connected to an OR gate 42, whose output is connected to one input of an AND gate 45 and to a carry output terminal 46.

A second input to AND gate 45 is obtained from a delay stage 48 which is fed by the data stream applied at terminal 21. The output of AND gate 45 is routed to an output terminal 49, which is the output for the rate multiplier. Programmable control of the circuit 11 is by way of input terminals 47, 50, 51 and 52, with terminal 47 connected to an input of AND gate 41, terminal 50 connected to an input of AND gate 40, terminal 51 connected to an input of AND gate 37 and terminal 52 connected to an input of AND gate 27.

The control terminals are arranged in the BCD 8-4-2-1 weighted decimal code which is used in many common decimal switches, counters and displays, with terminal 47 being the 8 input, terminal 50 being the 4 input, terminal 51 being the 2 input and terminal 52 being the 1 input. A "carry input" control signal may be applied at terminal 55 and a "carry output" signal is applied from the output of OR gate 42 to output terminal 46. The carry output signal of a less significant rate multiplier is fed to the carry input of the next more significant rate multiplier when it is necessary or desirable to cascade a plurality of rate multipliers for further division of the input signal.

A 10 state shift register cycle and a completely arbitrary associated count number are shown below:

| Count | Shift Register Stage |
|---|---|
|  | ABCDE |
| 0 | 00000 |
| 1 | 10000 |
| 2 | 11000 |
| 3 | 11100 |
| 4 | 11110 |
| 5 | 11111 |
| 6 | 01111 |
| 7 | 00111 |
| 8 | 00011 |
| 9 | 00001 |
| 0 | 00000 |
| . | . |
| . | . |
| . | . |

It is clear from the foregoing discussion of the shift register operation that each pulse applied to input terminal 21 will cause the shift register stages to assume the states associated with the next higher count number. Of particular importance is the fact that each individual stage of the shift register switches levels only every fifth clock pulse. Because the shift register stages are required to operate at a rate much slower than the clock rate, the rate multiplier is able to operate reliably at a higher clock rate than would be expected of a randomly operated shift register. With proper decoding it is possible to select 0, 1, 2, . . . 8 or 9 pulses out of each ten count cycle of the Johnson counter. The 10 states of this counter may be decoded as follows:

| Control Bit | Count | Decode Function |
|---|---|---|
|  | ABCDE |  |
| Carry input | 00000 | $\overline{A} \cdot \overline{E}$ |
| 1 | 11111 | $A \cdot E$ |
| 2 | 10000 | $A \oplus B$ |
|  | 01111 |  |
| 4 | 11100 | $C \oplus E$ |
|  | 11110 |  |
|  | 00011 |  |
|  | 00001 |  |
| 8 | 10000 | $A \oplus E$ |
|  | 11000 |  |
|  | 11100 |  |
|  | 11110 |  |
|  | 01111 |  |
|  | 00111 |  |
|  | 00011 |  |
|  | 00001 |  |

The symbol $A \cdot E$ represents the Boolean AND function, as defined in the truth table of FIG. 2b, performed on the contents of the A delay stage 12 and the E delay stage 20. The symbol $A \oplus B$ represents the Boolean exclusive-OR function, as defined in the truth table of FIG. 2a, performed on the contents of the A delay stage 12 and the B delay stage 15. The symbol $\overline{A}$ represents the complement of the contents of the A delay stage 12.

Figure 4:
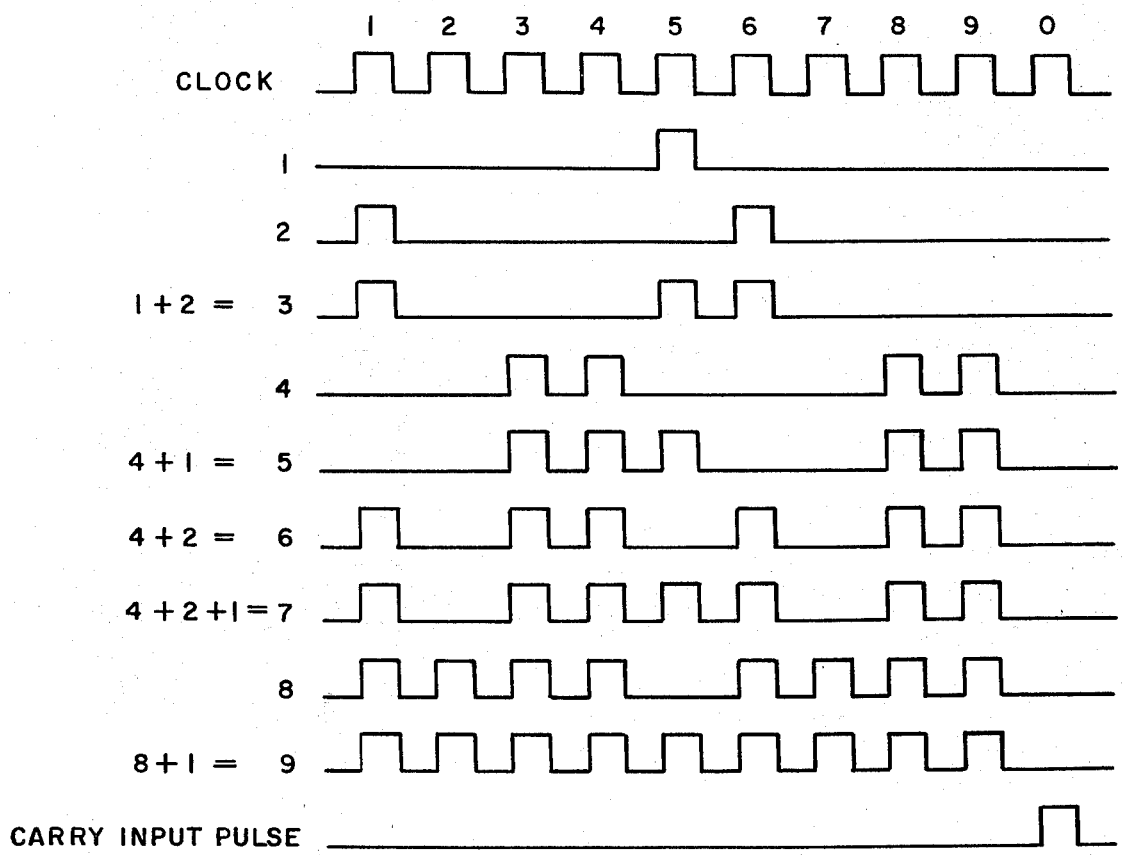
FIG. 4 is a timing diagram illustrating the possible outputs of the rate multiplier of FIG. 1.

It may be seen that by selective routing of the pulses provided by the given decode functions, any combination of pulses from one to nine are obtainable. For example, a 3-pulse output is obtainable by selecting both the $A \cdot E$ function (giving one pulse) and the $A \oplus B$ function (giving two pulses). FIG. 4 indicates how any number of output pulses may be obtained. The selection is accomplished by applying an enable signal to one or more of the input terminals 47, 50, 51 and 52. For example, an enable signal applied to terminal 47 activates AND gate 41 to allow passage of the pulses resulting from the decode function $A \cdot E$.

One pulse out of each 10 is passed to an input of OR gate 42. The truth table of FIG. 2c represents the allowable outputs of a 2-input OR gate. It may be easily seen that a multi-input OR gate such as OR gate 42 will have a logic 0 output only if all inputs are at logic 0, and will have a logic 1 output all other times. Enable signals applied to terminals 51 and 50 allow passage, respectively, of the four pulses resulting from the decode function $C \oplus E$ through AND gate 40 and of the two pulses resulting from the decode function $A \oplus B$ through AND gate 37. A total of six pulses is thereby passed to the inputs of the OR gate 42.

A delay stage 48 provides a time delayed equivalent of the input clock train to a second input of AND gate 45. The delay stage serves the purpose of "strobing" the output of OR gate 42, thereby causing the pulses derived by the gating logic to become separate, distinct pulses. The total delay in stage 48 should be sufficient to delay the input clock pulses by an amount equal to or slightly more than the accumulated propagation delay that occurs through the shift register stages and control logic. This is to insure that the clock strobing within gate 45 does not occur when the pulses appearing at the output of OR gate 42 are in a transition state.

In many applications, more than one decade of rate multiplication is desired. An important feature of the invention exists in the ease with which additional functionally equivalent rate multipliers may be cascaded to divide the input pulse train into smaller fractional parts. As stated before, the BCD control inputs allow generation of up to 9 pulses per counter cycle. The carry input state allows yet another, or 10th, pulse per cycle. By enabling AND gate 26 with a pulse applied to terminal 55 from the carry output of a second rate multiplier running at 1/10th the rate of the first rate multiplier, any number of pulses between 0 and 99 can be generated over 10 complete cycles of the first rate multiplier or one complete cycle of the second rate multiplier.

Figure 3:
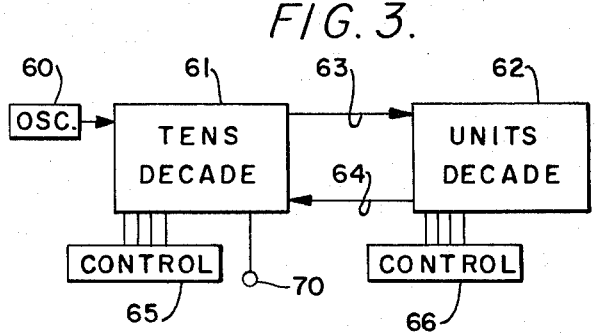
FIG. 3 is a block diagram of a two-decade rate multiplier utilizing two connected circuits of the type shown in FIG. 1.

A two decade rate multiplier is indicated in block diagram form in FIG. 3. A single oscillator 60 provides clock pulses to a tens (fastest stepping) decade rate multiplier 61. A line 63 connects the output terminal 13 (FIG. 1) of the rate multiplier 61 to an input terminal 21 (FIG. 1) of a units (slower stepping) decade rate multiplier 62. The carry output terminal 46 (FIG. 1) of the units decade rate multiplier 62 is connected to the carry input terminal 55 (FIG. 1) of the tens decade rate multiplier 61.

An external control 65 provides the appropriate enable for the tens decade 61 and a second control 66 provides the appropriate enable for the units decade 62. If it is desired, for example, to produce an output pulse train having 35 pulses for each 100 counts of the oscillator 60, the operator sets the enable control 65 to 3 and the enable control 66 to 5. Thereafter, for each 100 pulses of the oscillator 60 the rate multiplier 61 will provide 30 pulses to output terminal 70 and the rate multiplier 62 will provide five additional carry pulses to rate multiplier 61 via line 64, thereby producing a total of 35 pulses at the output terminal 70.

Because the clock for running the second, slower operating rate multiplier is only 1/10th as fast as the oscillator 60, the second clock may be derived by simply tapping the first stage of the Johnson counter of the first rate multiplier 61, that output being provided to the output terminal 13 (FIG. 1). This requirement that the second rate multiplier step only 1/10th as fast as the first means that the second rate multiplier can be constructed with slower, cheaper logic than the first rate multiplier. Naturally, the carry input terminal 55 of the second rate multiplier could be fed by the carry output terminal 46 of a third decade and so on. Maximum flexibility is thereby achieved in which an unlimited number of decades may be added with only two simple interconnections per decade.

It is obvious from the above description that the additional decades be only functionally equivalent, i.e., that they have a similar number of stages and compatible interconnection circuitry. They need not, for example, be constructed from the identical type of solid state technology. It is also obvious that the same cascading principle applies for any other rate multiplier weighting. For example, if four stages were used rather than five, one rate multiplier would divide the input pulse by $x/8$, for $x$ having any integer value from 0 to 7. A cascaded four stage addition would give a multiplier of $x/64$, for $x$ having any integer value from 0 to 63. In general, the addition of an $n$ stage rate multiplier gives a controllable fraction of $x/(2n)^2$ where $x$ may be equal to any integer value from 0 to $(2n)^2-1$.

A five-register binary device has $2^5$ or 32 possible states. The 10 states of the Johnson counting sequence described previously constitutes one of four possible "closed cycles". Should the counter ever contain a non-Johnson sequence count it would cycle indefinitely through an "illegal" sequence giving meaningless counts. A non-Johnson sequence could occur, for example, by the "random setting" of the shift register stages when the power supply is first turned on. However, these illegal closed cycles sequences all contain a state $\overline{A} \cdot B \cdot \overline{C}$ which does not occur in the proper sequence. The illegal sequences may be easily detected, therefore, by the AND gate 32 whose output can be used to clear, or reset, all shift register stages to logic 0, or any other "legitimate" values, which force the shift register stages into the proper sequence.

Having described as a preferred embodiment a decade rate multiplier, the inventor re-emphasizes that he does not intend that his invention be limited to a rate multiplier having five stages. Using straight-forward circuit analysis, a designer can easily develop quaternary, octal, hexadecimal, or any other even-integered rate multiplier.

What is claimed is:

1. A first apparatus for the generation of an output pulse train having a frequency which is a controllable fraction of an input pulse train, comprising:
   a source of input pulse signals;
   a Johnson counter to which said signals are applied, said counter having a predetermined number of stages and which steps through a predetermined count cycle at a stepping rate equal to the input pulse rate;
   an output terminal;
   means for detecting predetermined combinations of count values within the counter, and
   means for controlling said detecting means to regulate the number of pulses applied to the output during each count cycle.

2. The apparatus of claim 1 wherein the Johnson counter includes $n$ register stages and the controllable fraction is $x/2n$ where $x$ may be equal to any integer value from 0 to $2n-1$.

3. The apparatus of claim 2 further including:
   a second apparatus functionally equivalent to the first apparatus;
   means for connecting the output of a predetermined one of the counter stages to the $n$-long Johnson counter of the second apparatus; and
   means for controlling the detecting means of said second apparatus such that said controllable fraction becomes $x/(2n)^2$ where $x$ may be equal to any integer value from 0 to $(2n)^2-1$.

4. The apparatus of claim 3 wherein the counter of said second apparatus steps at a rate equal to $1/2n$ times the stepping rate of said first apparatus.

* * * * *